United States Patent
Adibi et al.

(10) Patent No.: US 9,594,810 B2
(45) Date of Patent: Mar. 14, 2017

(54) METHODS AND SYSTEMS FOR TRANSFORMING MULTIPLE DATA STREAMS INTO SOCIAL SCORING AND INTELLIGENCE ON INDIVIDUALS AND GROUPS

(71) Applicant: REUNIFY LLC, Los Angeles, CA (US)

(72) Inventors: Jafar Adibi, Los Angeles, CA (US); Edward Fullman, Beverly Hills, CA (US); Joseph Fullman, Los Angeles, CA (US); Patrick Robertson, Los Angeles, CA (US); Elena Fullman, Beverly Hills, CA (US); Emil Ettelaie, Los Angeles, CA (US); Namhee Kwon, Gardena, CA (US)

(73) Assignee: REUNIFY LLC, Santa Monica, CA (US)

( * ) Notice: Subject to any disclaimer, the term of this patent is extended or adjusted under 35 U.S.C. 154(b) by 299 days.

(21) Appl. No.: 13/843,431

(22) Filed: Mar. 15, 2013

(65) Prior Publication Data
US 2014/0089334 A1 Mar. 27, 2014

Related U.S. Application Data

(60) Provisional application No. 61/705,105, filed on Sep. 24, 2012.

(51) Int. Cl.
*G06F 7/00* (2006.01)
*G06F 17/30* (2006.01)
*G06Q 50/00* (2012.01)

(52) U.S. Cl.
CPC ....... *G06F 17/30539* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 6,963,975 B1 * | 11/2005 | Weare | ................... | G10L 19/018 704/E19.009 |
| 8,271,506 B2 * | 9/2012 | Martinez | ........... | G06F 17/30292 707/755 |
| 8,666,979 B2 * | 3/2014 | Chen et al. | ................... | 707/732 |

(Continued)

FOREIGN PATENT DOCUMENTS

| WO | WO9964970 A1 | 12/1999 |
|---|---|---|
| WO | WO2010005249 A2 | 1/2010 |

OTHER PUBLICATIONS

PCT/US2013/061142 ISR & WO of Dec. 30, 2013.

*Primary Examiner* — Hexing Liu
(74) *Attorney, Agent, or Firm* — Carlos R. Villamar; The Villamar Firm PLLC

(57) ABSTRACT

A system, method and computer program product for determining and identifying a highly accurate description of an entity, including discovering hidden attributes, features, characteristics, behaviors, and opinions of an entity; and identifying the entity through processing, summarizing, abstracting, generalizing, discovering, and inferring information from a plurality of databases including publicly available data, private purchased data, private data provided by others, and derived data from public or private data.

15 Claims, 9 Drawing Sheets

(56) References Cited

U.S. PATENT DOCUMENTS

| | | | |
|---|---|---|---|
| 2002/0045154 A1* | 4/2002 | Wood | G06Q 30/02 434/350 |
| 2004/0205045 A1 | 10/2004 | Chen et al. | |
| 2006/0052945 A1* | 3/2006 | Rabinowitz | G06F 19/24 702/20 |
| 2008/0040324 A1* | 2/2008 | Sadri et al. | 707/3 |
| 2008/0195654 A1* | 8/2008 | Weare | G06F 17/30598 |
| 2008/0270250 A1 | 10/2008 | Bolivar et al. | |
| 2009/0063284 A1* | 3/2009 | Turpin | G06Q 30/02 705/14.61 |
| 2009/0248682 A1* | 10/2009 | Hueter | G06Q 10/00 |
| 2009/0254971 A1* | 10/2009 | Herz et al. | 726/1 |
| 2011/0060794 A1* | 3/2011 | Sweeney | G06Q 30/02 709/204 |
| 2011/0072052 A1 | 3/2011 | Skarin et al. | |
| 2011/0270850 A1* | 11/2011 | Wana et al. | 707/749 |
| 2012/0110672 A1* | 5/2012 | Judge | H04L 51/12 726/25 |
| 2012/0215791 A1* | 8/2012 | Malik | G06F 17/30292 707/749 |
| 2012/0296920 A1* | 11/2012 | Sahni et al. | 707/749 |
| 2013/0073387 A1* | 3/2013 | Heath | G06Q 50/01 705/14.53 |
| 2013/0073389 A1* | 3/2013 | Heath | G06Q 50/01 705/14.54 |
| 2013/0073400 A1* | 3/2013 | Heath | G06Q 30/02 705/14.73 |
| 2013/0073473 A1* | 3/2013 | Heath | G06Q 30/02 705/319 |
| 2013/0124542 A1* | 5/2013 | Lee et al. | 707/751 |
| 2013/0166580 A1* | 6/2013 | Maharajh et al. | 707/758 |
| 2013/0218640 A1* | 8/2013 | Kidder | G06Q 30/0204 705/7.33 |
| 2013/0290317 A1* | 10/2013 | Spivack et al. | 707/723 |
| 2014/0012724 A1* | 1/2014 | O'leary | G06Q 20/4016 705/35 |
| 2014/0019470 A1* | 1/2014 | Zhu et al. | 707/758 |
| 2014/0287723 A1* | 9/2014 | LaFever | H04W 12/02 455/411 |
| 2015/0052128 A1* | 2/2015 | Sharifi | G06Q 30/0631 707/727 |
| 2015/0100887 A1* | 4/2015 | Verkasalo | G06F 3/0482 715/735 |
| 2015/0220814 A1* | 8/2015 | Verkasalo | G06Q 20/322 382/103 |
| 2015/0287422 A1* | 10/2015 | Short | G01S 7/288 704/205 |

* cited by examiner

FIG. 2

901 Personal & Identifiable Information

ID: 1234   Name: John Dow   SocialDNA: 790.23.345.23
FacebookID: J12345   TwitterID: JD45   URL: http://
Add.1: 12 Colorado AZ 90025 email2: johnD@test.com source: Facebook
Add.2: 14 Arizona CO 90025 email1: jd@test.com source: Twitter

902 Personal Attributes

| Item | Value | Date | Conf. | Source | Offset |
|---|---|---|---|---|---|
| Age | 25 | May 2010 | 0.8 | Facebook | 12 – 58 |
| Sex | M | Jan 2010 | 0.6 | Yelp | 7 – 24 |

Relationships

| Item | Value | Date | Conf. | Source | Offset |
|---|---|---|---|---|---|
| Follow | IID345 | July 2009 | 0.9 | Facebook | 1 – 45 |
| Friend | IID321 | Feb 2009 | 0.7 | Facebook | 9 – 19 |
| Father | IID32 | June 2010 | 0.2 | Twitter | 13 – 29 |

Extracted Information

| Item | Value | Date | Conf. | Source | Offset |
|---|---|---|---|---|---|
| iPhone | like | May 2010 | 0.8 | Facebook | 17 – 48 |
| Sport | + | June 2010 | 0.2 | Twitter | 11 – 49 |
| Tech | 790 | July 2009 | 0.4 | Facebook | 7 – 35 |

903 Authored Text

| | | |
|---|---|---|
| 1/1/10 | Facebook | Just saw the last episode of the Mad Man |
| 2/6/10 | Twitter | Enjoy my Trojan season ticket |

FIG. 9   900

METHODS AND SYSTEMS FOR TRANSFORMING MULTIPLE DATA STREAMS INTO SOCIAL SCORING AND INTELLIGENCE ON INDIVIDUALS AND GROUPS

CROSS REFERENCE TO RELATED DOCUMENTS

The present invention claims priority to U.S. Provisional Patent Application Ser. No. 61/705,105 of ADIBI et al., entitled "METHODS AND SYSTEMS FOR TRANSFORMING MULTIPLE DATA STREAMS INTO SOCIAL SCORING AND INTELLIGENCE ON INDIVIDUALS AND GROUPS," filed on Sep. 24, 2012, the entire disclosure of which is hereby incorporated by reference herein.

BACKGROUND OF THE INVENTION

Field of the Invention

The present invention generally relates to systems and methods for data mining, and the like, more particularly to systems and methods for transforming multiple data streams into social scoring and intelligence on individuals and groups, and the like.

Discussion of the Background

In recent years, systems and method for data mining, and the like, have been developed and continually refined. However, such systems and methods for data mining, and the like, have been hindered by various limitations, for example, including limitations related to social scoring and intelligence on individuals and groups, and the like.

SUMMARY OF THE INVENTION

Therefore, there is a need for methods and systems that address the above and other problems with systems and methods for data mining, and the like. Accordingly, the above and other needs are addressed by the illustrative embodiments of the present invention, which provide a novel method and system for transforming multiple data streams into social scoring and intelligence on individuals and groups, and the like.

Accordingly, in an illustrative aspect, there is provided a system, method and computer program product for determining and identifying a highly accurate description of an entity, including discovering hidden attributes, features, characteristics, behaviors, and opinions of an entity; and identifying the entity through processing, summarizing, abstracting, generalizing, discovering, and inferring information from a plurality of databases including publicly available data, private purchased data, private data provided by others, and derived data from public or private data.

The system, method and computer program product configured to align online and offline social graphs with consumer psychographic research data for optimizing offers and communications at a point of contact on a web sites, a mobile or social application, a call center, and a points-of-sale.

The system, method and computer program product configured to combine publicly available data for the entity with private data provided by a user, an individual or an organization.

The system, method and computer program product configured to abstract, represent, cluster and illustrate data points including an entity interest, feature, and opinion in based on soft or hard numbers and baskets of demographics and psychographics.

The system, method and computer program product configured to build a profile for the entity based on combination of data standardization, field approximation, field matching, and linking profiles.

Still other aspects, features, and advantages of the present invention are readily apparent from the following detailed description, simply by illustrating a number of illustrative embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings, in which like reference numerals refer to similar elements, and in which:

FIG. 1 is an illustrative system and method for transforming multiple data streams into social scoring and intelligence on individuals and groups, and the like;

FIG. 2 illustrates assigning scores in a range of zero to 100 to features, using pre-fixed feature-bins, and assigning corresponding binary values;

FIG. 9 illustrates an information architecture of the system and method which can include three layers (e.g., Layer 1: personal and identifiable information such as IDs, names, and the like; Layer 2: derived knowledge, personal attributes relationships interests, behaviors and opinions; and Layer 3: actual text and its date).

DETAILED DESCRIPTION OF THE PREFERRED EMBODIMENTS

To address the above and other problems with systems and methods for data mining, and the like, provided is new and useful systems and methods for determining and identifying a highly accurate description of an entity, whether an individual company, organization, place, time slot or a group (e.g., social, commercial, other) by discovering the entity's hidden attributes, features, characteristics, behaviors, and opinions, through processing, summarizing, abstracting, generalizing, discovering and inferring information from a wide variety of databases, such as publicly available data, private purchased data, private data provided by others, derived data from public or private data, and the like.

The databases the system may draw upon, for example, include social media data, geo-location data, census data, household data, company data, entities addresses, opt-in data, and historical data. The system transform these data sources into intelligence on individuals or groups through the system and methods described here. By connecting the dots between qualitative market research and quantitative behavioral data, the system provides a new unobstructed window into the universe of individuals or groups so one can discern individual or group desires and likes and their timing exactly. The unique group detection algorithms and methodology allows the system to provide scaling, such cross-channel record linkages a reality. The algorithms and systems align online and offline social graphs with traditional consumer psychographic research data, uncovering unique information that allows an end-user of the system to optimize offers and communications right at the point of contact on web sites, mobile and social apps, call centers, points-of-sale, and the like.

Figure 1:
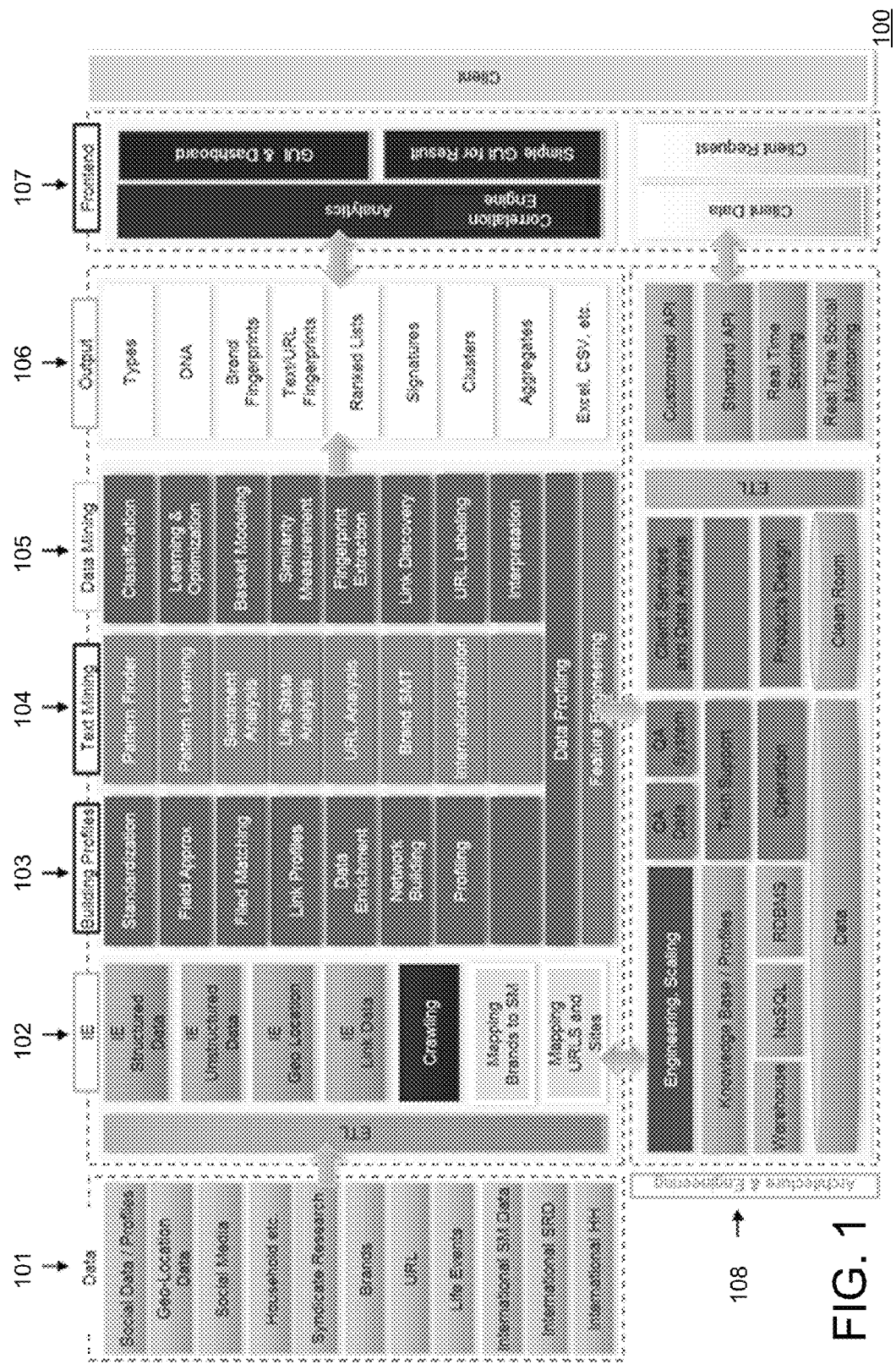

Referring now to the drawings, and FIG. 1 thereof, there is shown an illustrative system and method for transforming multiple data streams into social scoring and intelligence on individuals and groups, and the like. In FIG. 1, the system 100 can include data 101, for example, including social data and profiles; geo-location data, social media (SM) data both domestic and international, household data both domestic and international, syndicated research data (SRD) results both domestic and international, brands used data, URLs of web sites visited, data on life events, and the like.

Information extraction system 102 can include subsystems to extract information from structured data (e.g., database, embedded database, or a simple tab separated file), unstructured data (e.g., text, short messages, news), geo-location data (e.g., information about the position of a person), links between people, events, and other features, as well as subsystems for crawling, mapping brands to social media data, mapping URLs and web sites to users, and the like.

Profile builder 103 can be configured for standardization (e.g., to standardize various formats of information such as addresses), field approximation (e.g., to infer and predict a field such as the name of the city from the zip code), field matching (e.g., to match two different source of information to each other), linking profiles (e.g., to infer who is connected to who, or which entity is connected to which entity), data enrichment (e.g., to predict demographic features from current data points if its not available), network building (e.g., to discover who is strongly connected to who and eventually make a network of people), profiling (e.g., to extract, discover, maintain and updates entities' profiles) subsystems, and the like.

Text mining system 104 can include subsystems for pattern finding (e.g., discover potential hidden patterns in data), pattern learning (e.g., to learn discovered pattern and generalization of those patterns), sentiment analysis (e.g., to discover the sentiment of an opinion, text, or a module of information), life state analysis (e.g., to predict and discover various sets of life such as getting pregnant, being married, looking for job etc.), URL analysis, brand Social Media Translation (SMT—e.g., to map discovered brands form social media sources back to the database), internationalization, and the like.

Data mining system 105 can include subsystems for classification, learning and optimization, basket modeling, similarity measurement, fingerprint extraction, link discovery, URL labeling, interpretation, and the like.

Outputs 106 of the system can include types, DNA, brand fingerprints, text/URL fingerprints, ranked lists (e.g., which could be based on probability, likelihood, score or index), signatures, clusters, aggregates, a data export subsystem, for example, to Excel, CSV, and the like, formats.

Front-end 107 can include a correlation engine, analytics, graphic user interface (GUI), dashboard, and the like.

Engineering and architecture systems 108 can be configured to implement components 10 through 107, including a scaling subsystem, knowledge base/profiles, databases (e.g., RDBMS, NoSQL), data warehousing, operation, tech support, client services and data analysis, product design, cleanroom, standard and customized application programming interfaces (APIs), real-time scoring and real-time social monitoring subsystems, and the like.

The data system 101 feeds data into the information extraction system 102, which then passes the features and extracted information to the profile builder 103, which then passes the profiles to the text mining 104 and the data mining 105 systems to form the output 106 to be fed to the frontend 107. The various systems can be implemented via the engineering description and subsystems 108.

The data system 101 feeds a variety of types of raw data into the information extraction system 102, the information extraction system 102 extracts features and information from structured or unstructured data passed to it, as well as geo-location data, and link data, and performs additional data crawling if necessary. The information extraction system 102 also maps brands, web sites, and URLs, to social media data. It then passes the features and extracted information to the profile builder 103, which performs data standardization, field matching, and field approximation for some of the features and data points. The profile builder 103 in this way thus enriches the data, and builds a network and complete data profile. It then passes the profiles to the text mining 104 and data mining 105 systems for discovery and learning of patterns, sentiment analysis, life state analysis, classification, optimization, similarity measurement, fingerprint extraction, link discovery, URL labeling and interpretation. The output 106 of this flow is then ready and displayed in a GUI frontend 107, either in raw form or further processed or correlated form. The engineering and architecture system is the implementation side of systems 101 through 108 and includes various features, such as real time scoring, real time social monitoring, a knowledgebase, and a database.

Figure 2:
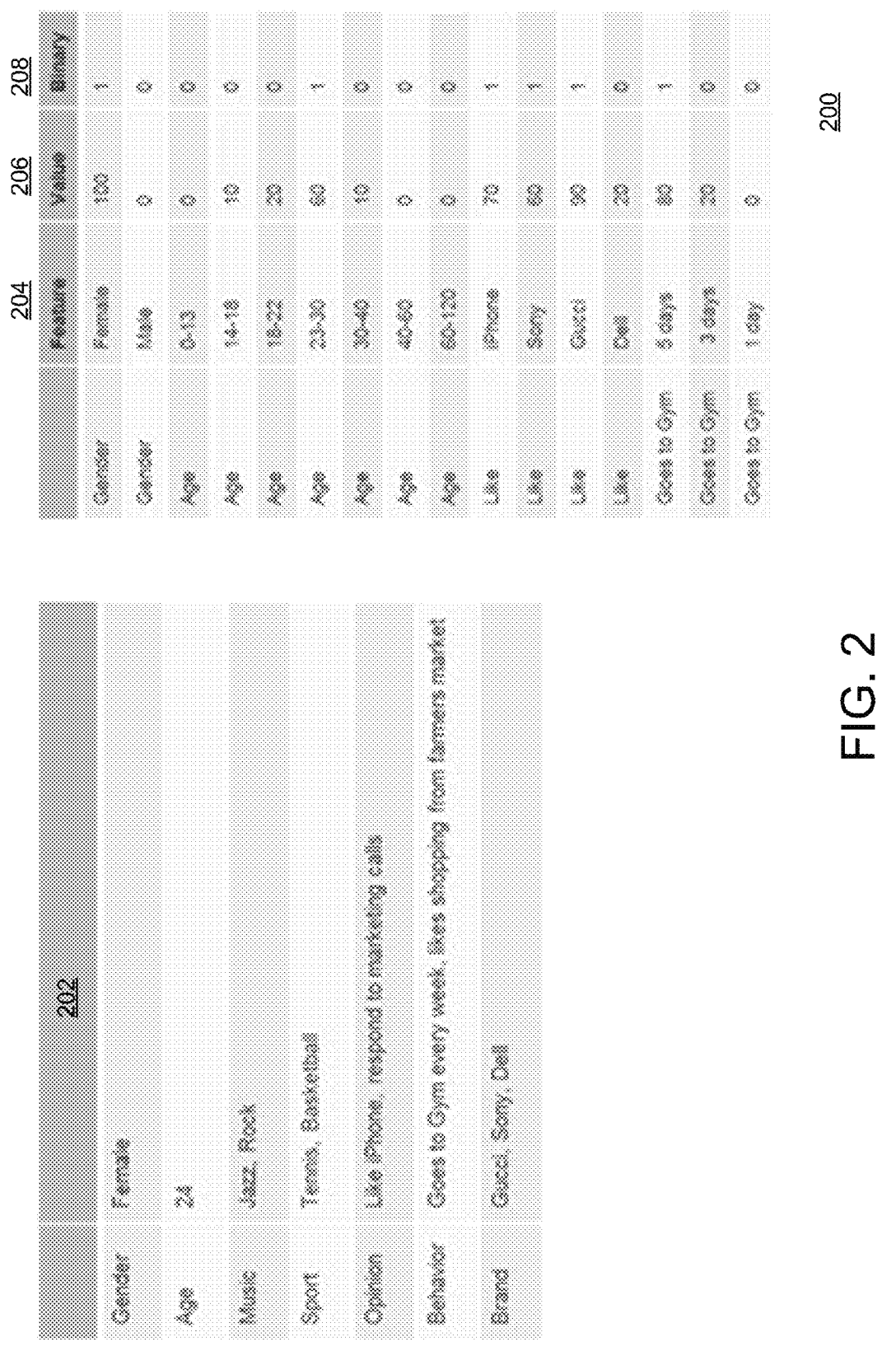

FIG. 2 illustrates assigning scores in a range of zero to 100 to features, using pre-fixed feature-bins, and assigning corresponding binary values. In FIG. 2, the system considers a person for whom the system wishes to determine a detailed profile, and for whom certain initial data 202 is available—a 24 year old female who likes jazz and rock music, enjoys tennis and basketball, likes the Apple iPhone, and responds to marketing phone calls, goes to the gym every week; likes shopping from farmers market; and has an affinity for certain brands (e.g., Gucci, Sony, and Dell).

The system first places her within predetermined feature-bins 204 with both raw scores 206, and binary scores 208.

For example, the system may estimate that her affinity for the brand Gucci is very high, and system therefore assigns a value of 90 (e.g., out of 100) to this feature, together with a binary value of 1. Similarly, the system may determine that her affinity for the brand Dell may be low, with a score of 20, and a binary score of zero. Similar value assignments for well-known features (such as age) and not so well-known features (how many days a week does she go to the gym) are presented in FIG. 1 as well.

Figure 3:
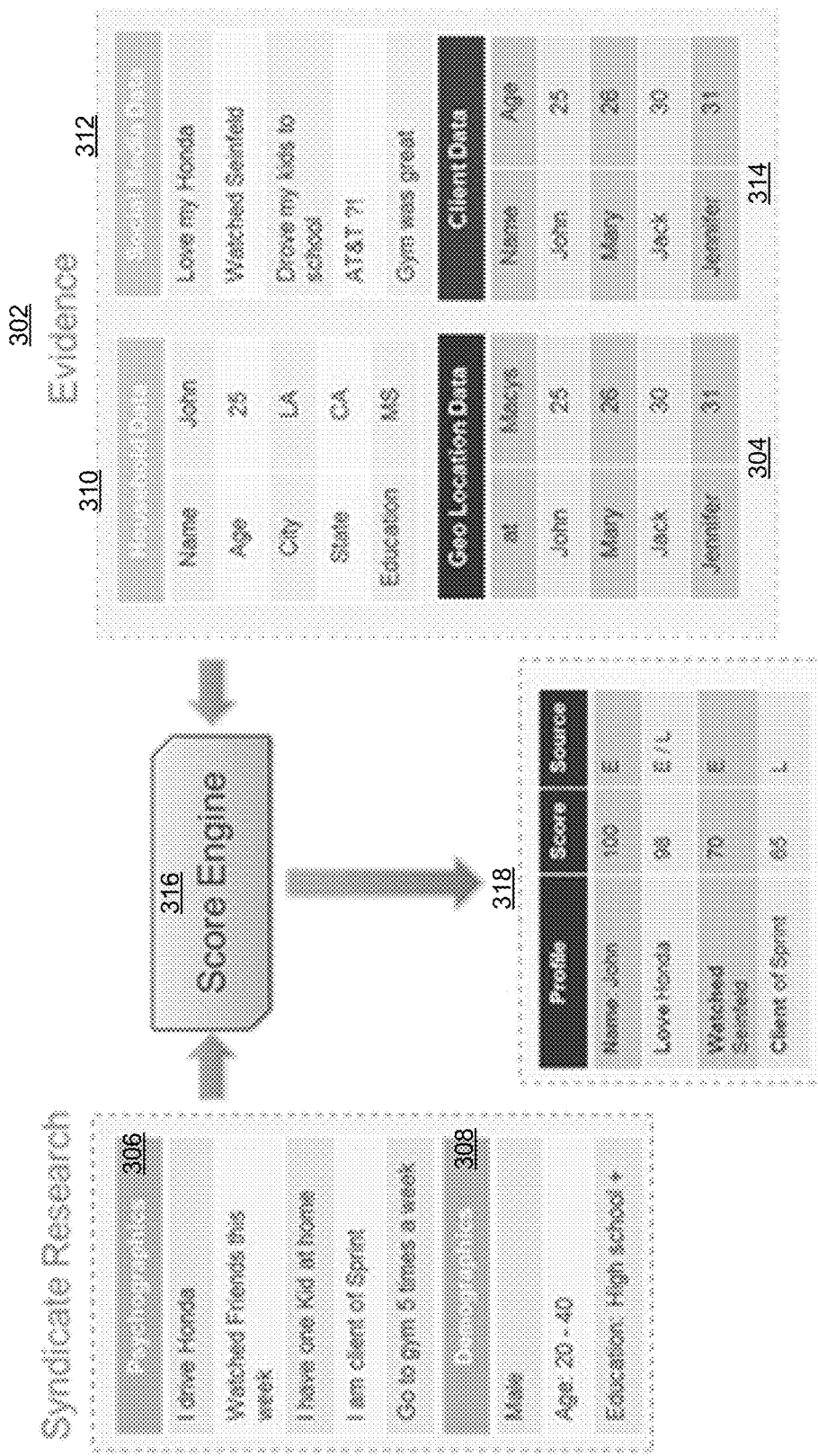
FIG. 3 illustrates combining psychographic and demographic data, for example, from syndicated research data, and hard known facts (e.g., evidence) to assign scores to features of a user.

In FIG. 3, the system extends the example in FIG. 2 to "John" for whom two sets of information are known. The system refers to one set, for which the system has hard facts and data, as "evidence" 302. Examples of "evidence" 302 are client data 314 such as John's age, place of residence, level of education (e.g., household data 310); social media data 312 such as his likes and dislikes which he has volunteered on social media such as Facebook (e.g., loving his Honda, enjoying Seinfeld and the gym), and even speculations which are most likely correct (e.g., in all likelihood John has a cell phone, with service speculated to be provided by AT&T). Other examples of such hard facts are geo-location data 304, for example, when John was identified in Macys. This extracted information is then processed and combined with other data sources, such as syndicated psychographic 306 and demographic 308 research data (e.g., a person who drives a Honda, is a client of Sprint, has one young child, and goes to the gym, is most likely male, between the ages of 20 and 40, with a minimum high school education) and scored via score engine 316 to generate a profile 318.

Figure 4:
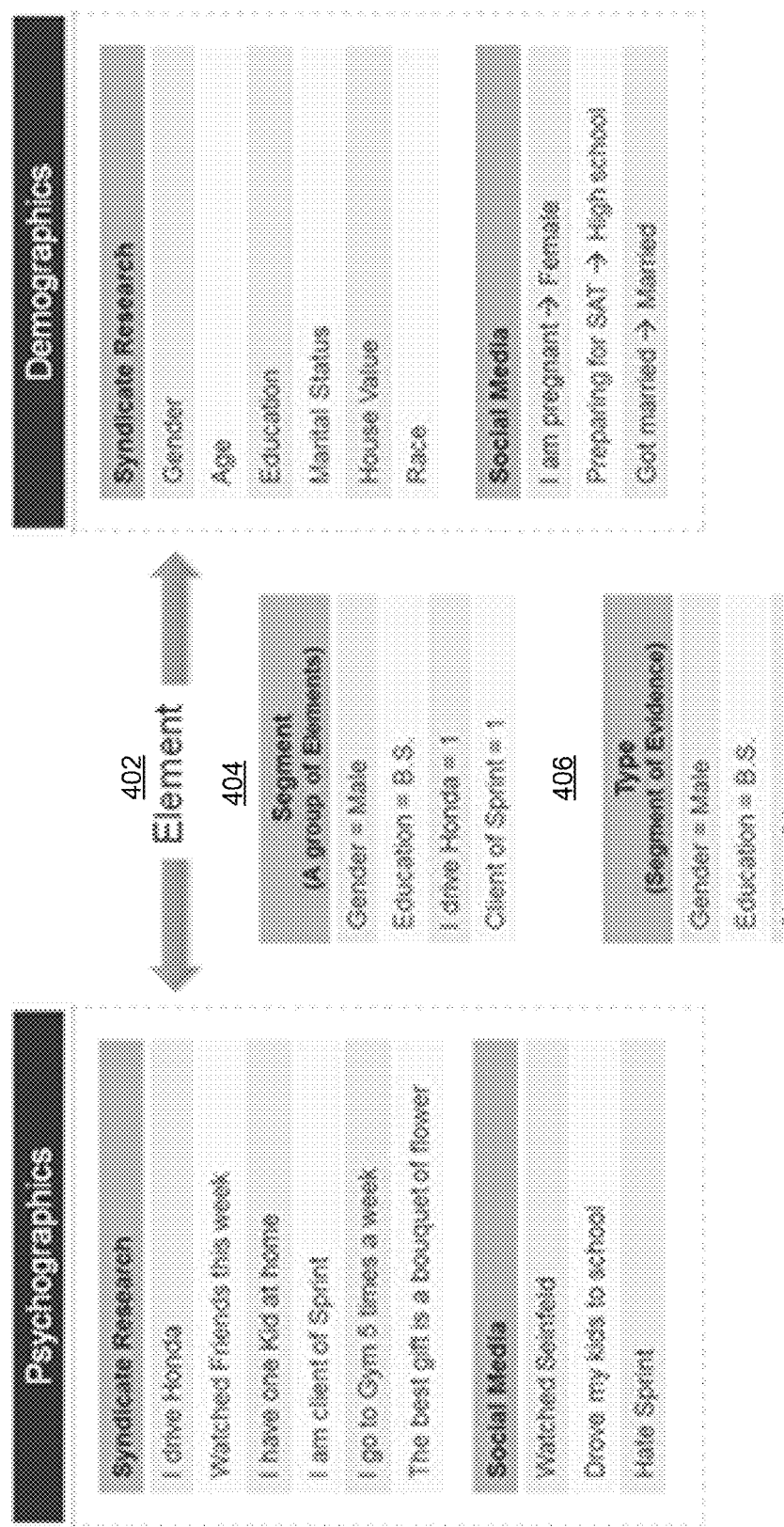
FIG. 4 illustrates examples of a segment (e.g., group of elements) and a type (e.g., segment of hard facts or evidence)

These unique data points can be referred to as elements 402, as shown in FIG. 4. The system represent data as segments 404 (e.g., groups of elements) and types 406 (e.g., segment of evidence). Segments 404 and types 406 are then combined via suitable algorithms to form individual DNAs 502 (e.g., binary assignments) and signature 504 (e.g., zero to 100 score assignments), as shown in FIG. 5.

Figure 5:
FIG. 5 illustrates combining psychographic and demographic data from different sources, to arrive at individual or group DNAs (e.g., binary) or signatures (e.g., scores in the range of zero to 100)

The signatures 504 and DNAs 502 are then clustered together into baskets of potential combinations of features (FIG. 5). In this example, the system clusters the data points 506 into 200 baskets 602 each of which is defined by, for example, 250,000 related data entries/features. For example, every person in Basket 1 has a high likelihood of liking McDonalds, Pepsi, driving a BMW, and being a single male.

Figure 6:
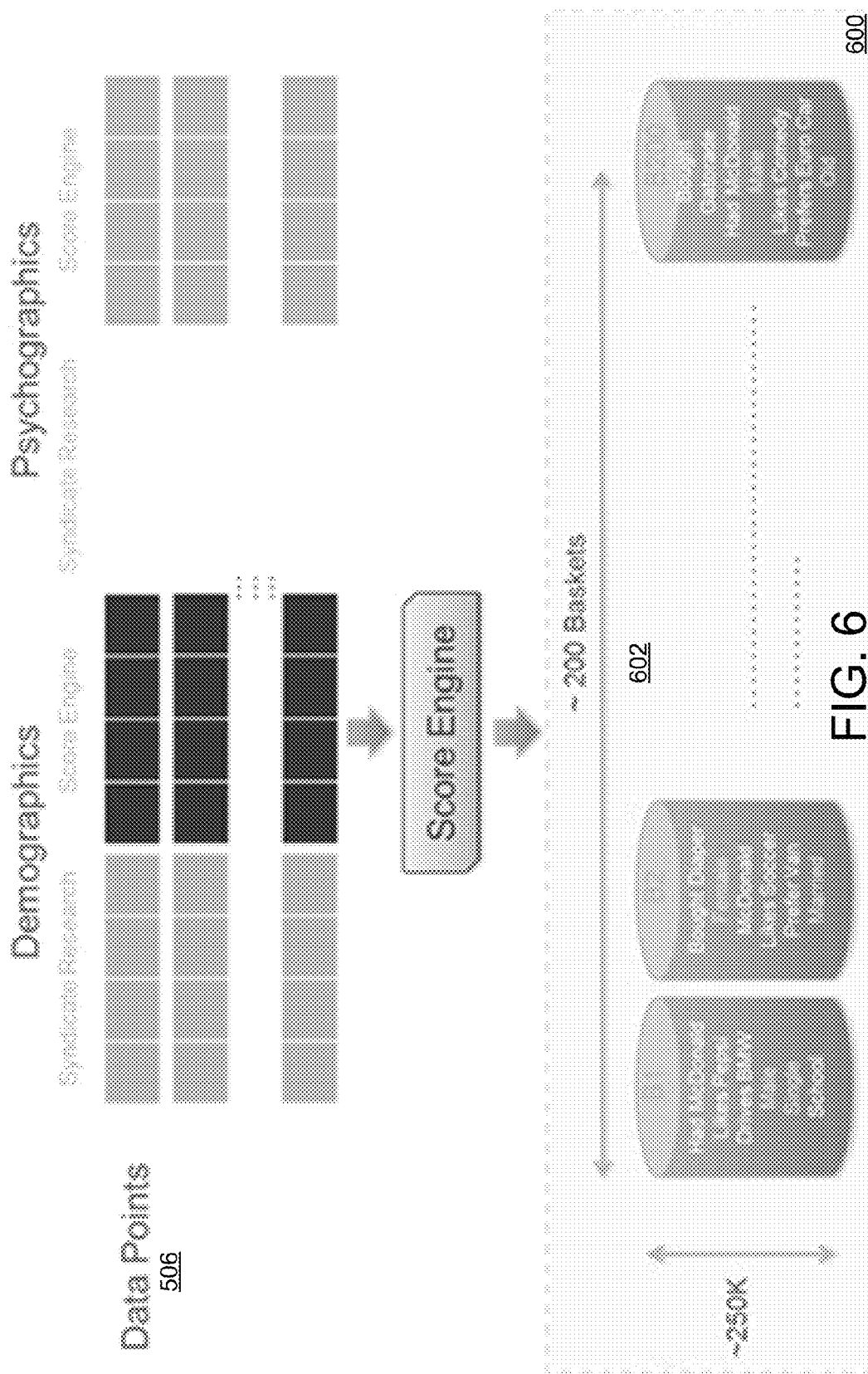
FIG. 6 illustrates clustering combined data points in FIG. 5 into baskets of potential combinations of features (e.g., clustering data points into 200 baskets each of which is defined by 250,000 related data entries/features)
Figure 7:
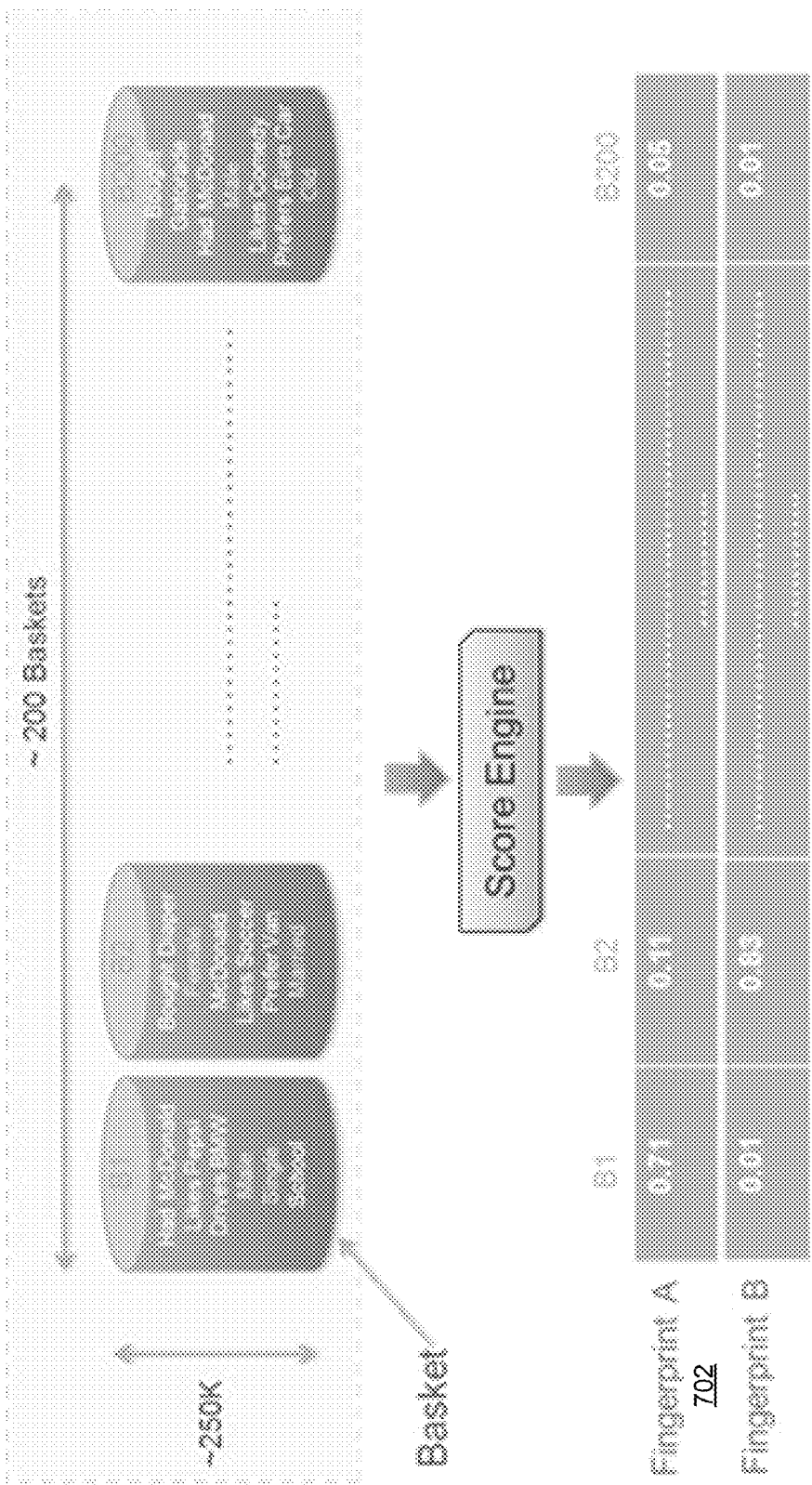
FIG. 7 illustrates projection of newly arrived data vector onto baskets in FIG. 6, and determination of a degree to which a new data vector belongs to each basket, and formation of a fingerprint vector based on projection results.

With the information extraction, data mining, and text mining steps now finished, the system is ready to classify new data, as shown in FIG. 7. A newly arrived data vector representing a new individual or a group is projected onto the baskets 602 in FIG. 6, and the degree to which the new data vector belongs to each basket is then determined, and a corresponding fingerprint vector 702 is computed based on the projection results. In this example, the newly arrived data vector (Fingerprint A) has a high likelihood of falling in Basket 1 (71%).

Figure 8:
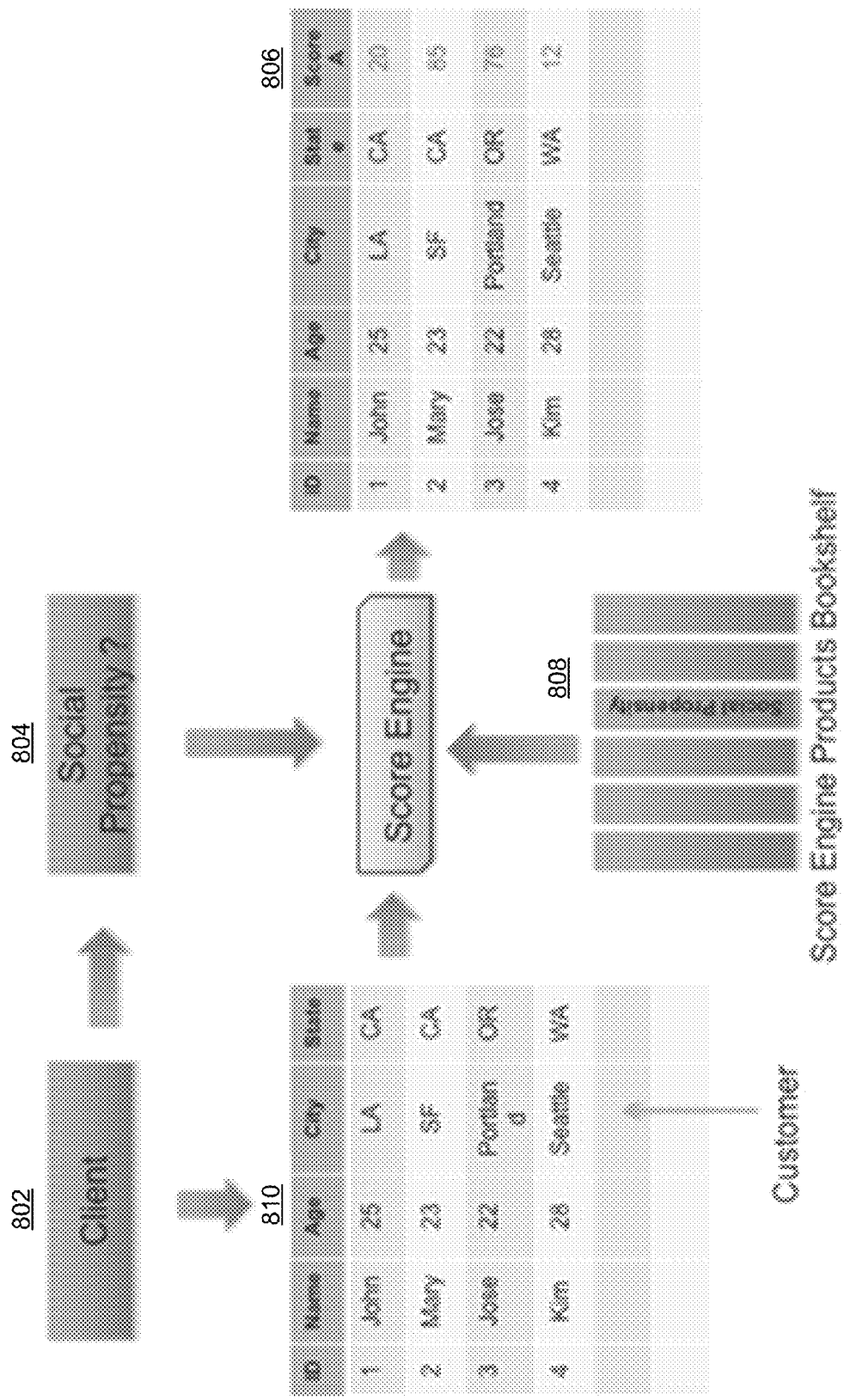
FIG. 8 illustrates determination of an answer posed by a customer (e.g., a user (e.g., Sprint) wishes to find out social propensity of a set of its customers for purposes of pitching mobile phone services to them and which is done via determining a score for each customer who represents his/her social propensity, based on the fingerprint determination done in FIG. 7.

The system can also determine the answer to a question posed by a customer. As shown in FIG. 8, a user 802 (e.g., Sprint) wishes to find out the social propensity 808 of a set of its customers 810 for the purposes of pitching mobile phone services to them. This can be performed via determining a score 806 for each customer, which represents his/her social propensity, based on the fingerprint determination done in FIG. 7. Social propensity may for example be defined as an aggregate score encompassing features such as frequency of Facebook use, number of friends on Facebook, use of micro blogging sites, using a mobile phone to update Facebook, and spending several hours a day on the Internet.

The function of the information extraction, profile builder, text mining, and data mining systems of FIG. 8 is thus to extract, process, and make sense of (semi) structured information from unstructured data automatically—for example, using natural language processing techniques—and extracting relevant and domain specific information from text streams. The information extraction and mining systems thus address very specific problems. The system looks for information which is useful for entity identification (e.g., its attribute and relations); related to a system goal—finding the right treatment for the right customer; and delivers values to clients as specified by the clients. A focus of the system is on information about people, their attributes, their interests and their relationships. This information is either static or dynamic. Static information has attributes that do not change frequently over time, are somewhat predictable, and may be deterministic—more or less (e.g., age, gender, education, etc.). Dynamic information has attributes that change over time frequently (e.g., movies watched by a person, products reviewed by a person, favorite products, etc.).

Using the information extraction and mining system of FIG. 8, the system can provide a set of scores assigned to each feature and to each individual or group. The scores can directly represent or be interpreted as likelihood or probability, or an index, permitting transparent and readily understandable comparisons among individuals or groups.

Via weighted combination of elements defined and computed by the system, the system can define a variety of products, broadly categorized into:

(1) Standard products, with are industry independent products. Examples are social propensity, mobile propensity, recklessness, life outlook (optimism), and the like.

(2) Customized products which are Industry specific products. Examples are frequent flyer propensity, likelihood of donations to public radio, and the like.

The information architecture of the system shown in FIG. 9 can include three layers: Layer 901: personal and identifiable information, such as IDs, names, and the like; Layer 902: derived knowledge, personal attributes relationships interests, behaviors and opinions; and Layer 903: actual text and its date.

Layer 901 can include possible social media IDs, phone numbers, emails and any type of information which might be used for identification can be stored in this layer. This layer can be physically separated from the rest of the application and data storage for responsible aggregation and privacy concerns.

Layer 902 is the information layer. Attributes (e.g., age, gender, zip code, salary, etc.) along with a confidence level is be stored in this layer. Relationships and connections among entities also are stored in this layer. Extracted knowledge from entities can be stored in this layer. For each entity, the system can match the entity attributes to the available syndicate research data or a predetermined baseline and stores the confidence values.

Layer 903 is the Text Layer. Here the system keeps the actual text, source and its date, since clients might want to look at the actual text; the system might need to extract more information from free text in future; the system employs this data for future research and development; and the system may need this data to tune and modify the data mining and machine learning algorithms.

The above described systems and methods can include alternative embodiments and implementations of the engineering and architecture system, for example, using different databases, knowledgebase, tech support systems, client services, and real-time scoring and real-time social monitoring, and the like.

The above-described devices and subsystems of the illustrative embodiments can include, for example, any suitable servers, workstations, PCs, laptop computers, PDAs, Internet appliances, handheld devices, cellular telephones, wireless devices, other electronic devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, G3 communications networks, Public Switched Telephone Network (PSTNs), Packet Data Networks (PDNs), the Internet, intranets, WiMax Networks, a combination thereof, and the like.

It is to be understood that the devices and subsystems of the illustrative embodiments are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, application processors, domain specific processors, application specific signal processors, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (e.g., if processing is distributed) of the processing performed in implementing the illustrative embodiments. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present invention can be distributed for better performance, reliability, cost, and the like.

As stated above, the devices and subsystems of the illustrative embodiments can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, flash memories, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of illustrative embodiments and implementations, the present invention is not so limited, but rather covers various modifications and equivalent arrangements, which fall within the purview of the appended claims.

What is claimed is:

1. A computer implemented system for determining and identifying a highly accurate description of an entity, the system comprising:
a processor and a memory executing:
a profiling device that combines psychographic and demographic data from a plurality of different sources to generate individual and group DNAs comprising binary values related to the psychographic and demographic data that can be assigned binary values, and individual and group signatures comprising scores in a range from 0 to 100 related to the psychographic and demographic data that can be assigned numerical values ranging from 0 to 100;
a clustering device that combines the generated DNAs and signatures from the profiling device into a plurality of baskets of combinations of related data entries and features, including clustering into 200 baskets each of which is defined by 250,000 related data entries and features; and
a projecting device that projects a data vector representing a new individual or a group onto the baskets from the clustering device by determining a degree to which the data vector belongs to each basket, and generating a fingerprint vector including the likelihood of the data vector falling into each basket.

2. The system of claim 1, wherein the system further comprises an aligning device configured to align online and offline social graphs with the generated fingerprints for optimizing offers and communications at a point of contact on a web sites, a mobile or social application, a call center, and a points-of-sale.

3. The system of claim 1, wherein the system further comprises a combining device configured to combine publicly available data for the entity with private data provided by a user, an individual or an organization.

4. The system of claim 1, wherein the system further comprises a display device configured to abstract, represent, cluster and illustrate data points including an entity interest, feature, and opinion based on soft or hard numbers and the baskets of the demographics and psychographics.

5. The system of claim 1, wherein the system further comprises a profiling device configured to build a profile for the entity based on combination of data standardization, field approximation, field matching, and linking profiles.

6. A method for a computer implemented system for determining and identifying a highly accurate description of an entity, the method comprising:
combining with a profiling device psychographic and demographic data from a plurality of different sources to generate individual and group DNAs comprising binary values related to the psychographic and demographic data that can be assigned binary values, and individual and group signatures comprising scores in a range from 0 to 100 related to the psychographic and demographic data that can be assigned numerical values ranging from 0 to 100;
combining with a clustering device the generated DNAs and signatures from the profiling device into a plurality of baskets of combinations of related data entries and features, including clustering into 200 baskets each of which is defined by 250,000 related data entries and features; and
projecting with a projecting device a data vector representing a new individual or a group onto the baskets from the clustering device by determining a degree to which the data vector belongs to each basket, and generating a fingerprint vector including the likelihood of the data vector falling into each basket.

7. The method of claim 6, further comprising aligning with an aligning device online and offline social graphs with consumer psychographic research data for optimizing offers and communications at a point of contact on a web sites, a mobile or social application, a call center, and a points-of-sale.

8. The method of claim 6, further comprising combining with a combining device publicly available data for the entity with private data provided by a user, an individual or an organization.

9. The method of claim 6, further comprising abstracting, representing, clustering and illustrating data points with a display device as an entity interest, feature, and opinion based on soft or hard numbers and the baskets of the demographics and psychographics.

10. The method of claim 6, further comprising building with a profiling device a profile for the entity based on combination of data standardization, field approximation, field matching, and linking profiles.

11. A computer program product for a computer implemented system for determining and identifying a highly accurate description of an entity, and including one or more computer readable instructions embedded on a non-transitory, tangible computer readable medium and configured to cause one or more computer processors to perform the steps of:
combining with a profiling device psychographic and demographic data from a plurality of different sources to generate individual and group DNAs comprising binary values related to the psychographic and demographic data that can be assigned binary values, and individual and group signatures comprising scores in a range from 0 to 100 related to the psychographic and demographic data that can be assigned numerical values ranging from 0 to 100;
combining with a clustering device the generated DNAs and signatures from the profiling device into a plurality of baskets of combinations of related data entries and features, including clustering into 200 baskets each of which is defined by 250,000 related data entries and features; and
projecting with a projecting device a data vector representing a new individual or a group onto the baskets from the clustering device by determining a degree to which the data vector belongs to each basket, and generating a fingerprint vector including the likelihood of the data vector falling into each basket.

12. The computer program product of claim 11, further comprising further comprising aligning with an aligning device online and offline social graphs with consumer psychographic research data for optimizing offers and communications at a point of contact on a web sites, a mobile or social application, a call center, and a points-of-sale.

13. The computer program product of claim 11, further comprising further comprising combining with a combining device publicly available data for the entity with private data provided by a user, an individual or an organization.

14. The computer program product of claim 11, further comprising abstracting, representing, clustering and illustrating data points with a display device as an entity interest, feature, and opinion based on soft or hard numbers and the baskets of the demographics and psychographics.

15. The computer program product of claim 11, further comprising building with a profiling device a profile for the entity based on combination of data standardization, field approximation, field matching, and linking profiles.

\* \* \* \* \*